A. H. DE VOE.
MECHANICAL MOVEMENT.
APPLICATION FILED OCT. 26, 1915.
1,231,136.
Patented June 26, 1917.
3 SHEETS—SHEET 1.
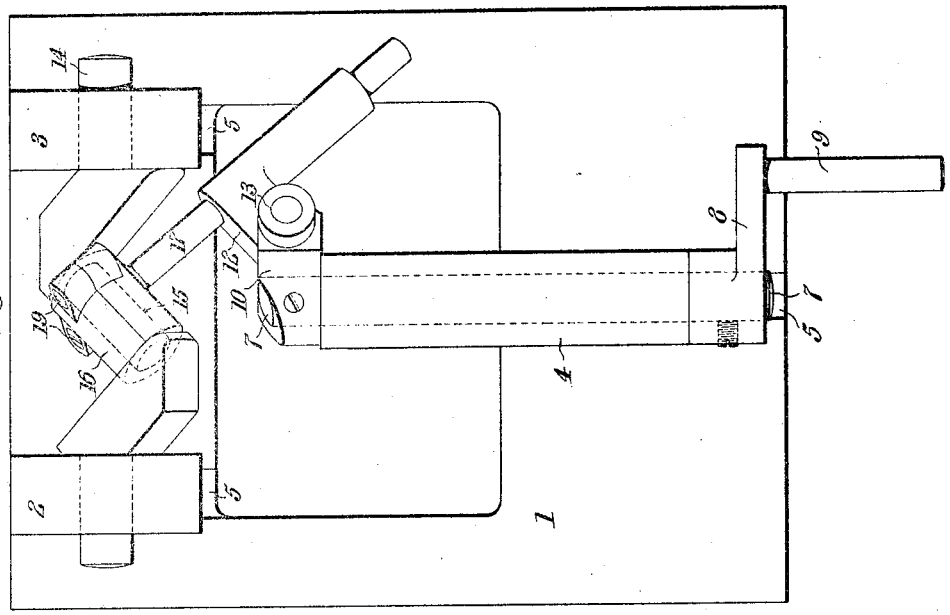
WITNESSES:
INVENTOR
ALBERT H. DE VOE
BY
ATTORNEY A. H. DE VOE.
MECHANICAL MOVEMENT.
APPLICATION FILED OCT. 26, 1915.
1,231,136.
Patented June 26, 1917.
3 SHEETS—SHEET 2.
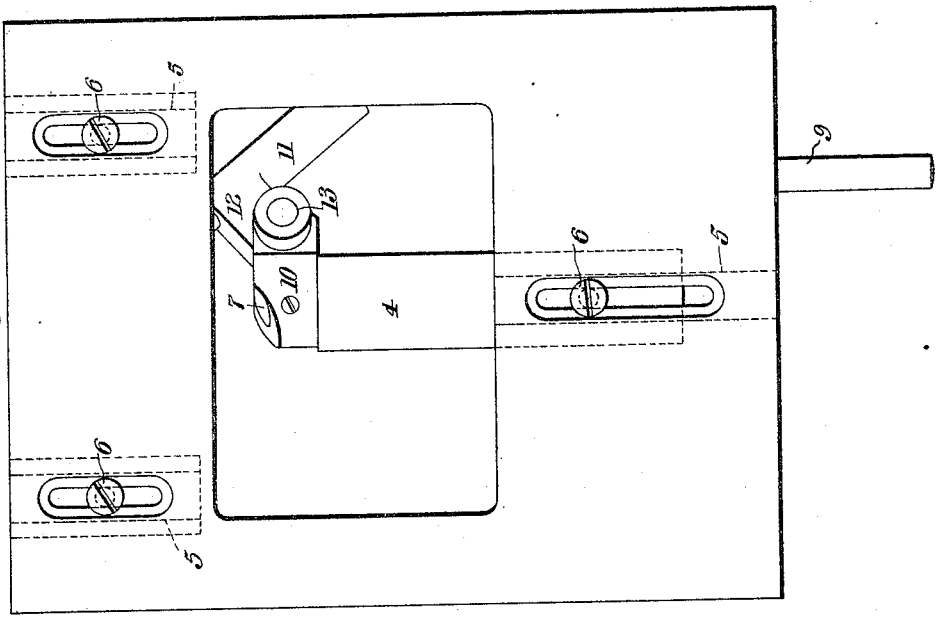
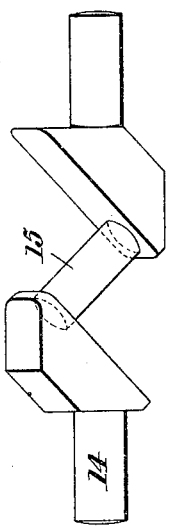
WITNESSES:
INVENTOR
ALBERT H. DE VOE
BY
ATTORNEY

A. H. DE VOE.
MECHANICAL MOVEMENT.
APPLICATION FILED OCT. 26, 1915.

1,231,136.

Patented June 26, 1917.
3 SHEETS—SHEET 3.

WITNESSES:
L. E. Fischer.
Géza L. Ferua

INVENTOR
ALBERT H. DE VOE
BY
ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

MECHANICAL MOVEMENT.

1,231,136.  Specification of Letters Patent.  Patented June 26, 1917.

Application filed October 26, 1915. Serial No. 57,919.

*To all whom it may concern:*

Be it known that I, ALBERT H. DE VOE, a citizen of the United States, residing at Westfield, in the county of Union and State of New Jersey, have invented certain new and useful Improvements in Mechanical Movements, of which the following is a specification, reference being had therein to the accompanying drawings.

This invention relates to improved means for converting the rotary motion of a driving shaft into oscillatory movements of a driven shaft whose axis of oscillation is arranged substantially at right angles to that of the driving shaft, the object being to provide simple, compact and durable means for operatively connecting the two shafts, and to effect different degrees of oscillation the shafts are made adjustable, preferably each with respect to the other, and the operative connections are provided with a hinged joint, which latter, while not essential to a device having only a given degree of oscillation is preferred as it comprises means which largely compensate for slight variations in construction and the relative arrangement of the several parts.

Figure 6:
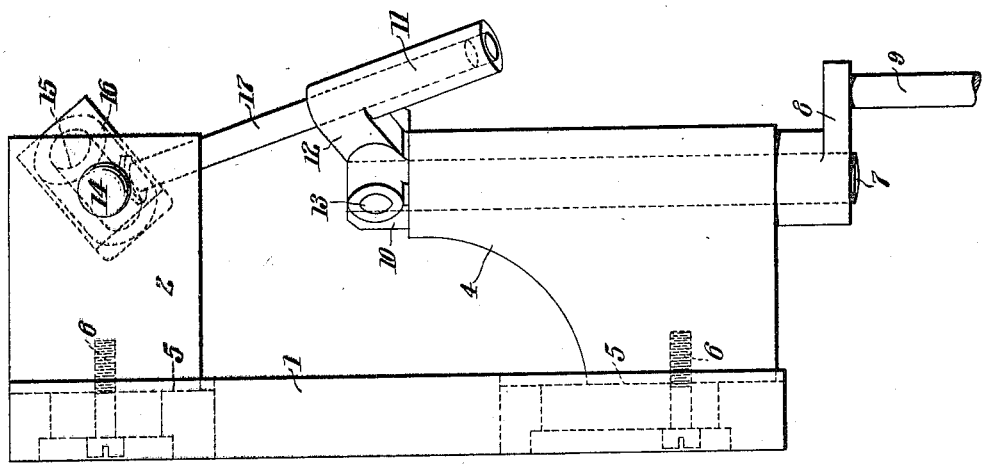
Figure 5:
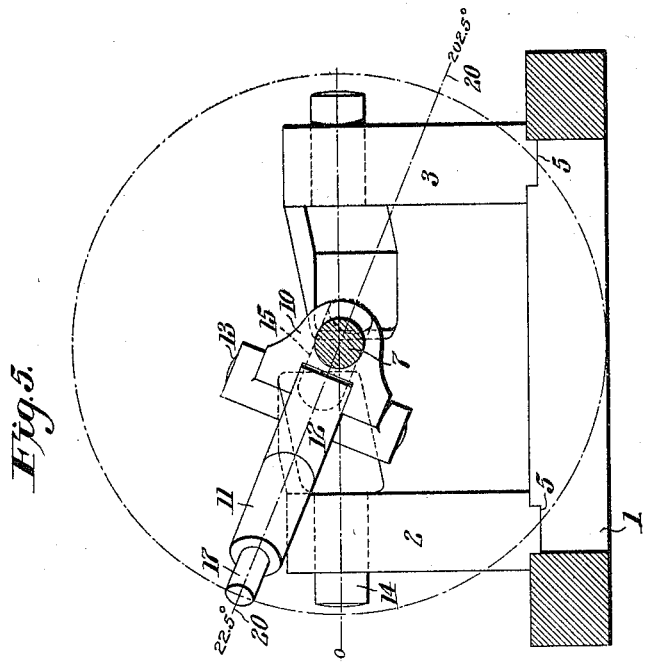

In the accompanying drawings, which form a part of the specification, Figure 1 is a plan view of the present improved means illustrating the oscillating shaft in one of its two positions of reverse movement. Fig. 2 is a view illustrating the oscillating shaft in its second position of reverse movement. Fig. 3 is a detail of the oscillating shaft. Fig. 4 is an underside view of Fig. 1. Fig. 5 is a front end elevation, partly in section, and Fig. 6 is a side elevation of the present device illustrating the rotary driving shaft, and parts carried by the latter, adjusted away from the oscillating shaft, or in a direction to lessen the amplitude of oscillation of the latter.

Referring to the drawings, 1 represents a base plate provided with bearing lugs 2, 3 and 4 adjustably secured in guideways, as 5, by screws, as 6, and into the lug 4 is journaled a rotary shaft 7 which, for convenient manual manipulation, has suitably secured to it an arm 8 provided with a handle 9, the opposite end of said shaft having suitably secured to it a shaft crank comprising the collar 10 and tubular bearing 11 provided with the lug 12, which latter, instead of being formed integral with the collar 10 as is permissible when only a given amplitude of oscillation is required, is hinged as at 13.

14 represents an oscillating shaft suitably journaled in the lugs 2 and 3 and provided with a crank member 15 whose axis is arranged, in the present instance, at an angle of 45° to the axis of said shaft, and the axis of the latter at substantially right angles to the axis of the shaft 7, and upon said crank member is journaled a bearing sleeve 16 provided with a power transmitting connection 17 which loosely enters the tubular bearing 11, the separate halves of the bearing sleeve being secured upon the crank member by screws, as 19.

By reference to the figure it will be understood that the axes of the shafts and the power transmitting connection are, at all times in intersecting relationship with substantially a given point in the axis of the crank member.

Having set forth the details in construction, the following sequence of movements and coöperation of parts will be readily understood.

The relative arrangement of the parts, as illustrated in Figs. 1 and 2, are such as effect movements of the oscillating shaft 14 of 136° or reverse oscillations of 272° to one complete rotation of the driving shaft. Taking Fig. 1 as representing the zero or starting position, at which time the oscillating shaft occupies its position of reverse oscillation and the axis of the power transmitting connection is positioned in its upward movement about the axis of the driving shaft in an inclined plane intersecting the axes of the driving shaft and crank member, the bearing sleeve 16 is out of driving relationship with the oscillating shaft after completing its oscillatory movement in the direction indicated by the arrow *s*, Fig. 1, and about to move the oscillating shaft in a reverse direction or in the direction indicated by the arrow *t*, Fig. 1, the reverse drive taking effect as the axis of the connection 17 passes the inclined plane 20 intersecting the axes of the driving shaft and crank member, thus causing the bearing sleeve to act upon the crank member and oscillate it to the position illustrated in Fig. 2, when the axis of the connection 17 passes to the opposite side of the inclined plane 20, thus reversing the direction of oscillation and continuing such reverse movement until the parts are brought to their starting or positions of reverse drive, as shown in Fig. 1.

In Fig. 6 the relative arrangement of the parts are such as to give to the oscillating shaft oppositely arranged movements of 90° each or 180° for each complete movement of the rotary shaft, such arrangement of parts being effected, in the present instance, by adjusting the shaft crank away from the axis of the oscillating shaft.

It is to be understood that varying degrees of oscillation may be effected by changing the radius of the circle described by the connection 17 about the axis of the rotary shaft, such adjustments being permitted, in the present construction, by the employment of the hinge joint 13, and further, that the degree of inclination of the plane intersecting the axes of the driving shaft, power transmitting connection and crank member, as shown in their positions of reverse drive, depends upon the degree of incline given the crank member with respect to its shaft.

Having thus set forth the nature of the invention, what I claim herein is:—

1. In a mechanical movement, in combination, a rotary driving shaft, a driven shaft arranged substantially at right angles to said driving shaft and provided with a crank member inclined to its axis, and means for operatively connecting said driving shaft with said crank member for transmitting to said driven shaft oscillatory movements.

2. In a mechanical movement, in combination, a rotary driving shaft, a driven shaft arranged substantially at right angles to said driving shaft and provided with a crank member inclined to its axis, and means for operatively connecting said driving shaft with said crank member, including a power transmitting connection whose axis is inclined to the axis of said driving shaft, for transmitting to said driven shaft oscillatory movements.

3. In a mechanical movement, in combination, a rotary driving shaft, a driven shaft arranged substantially at right angles to said driving shaft and provided with a crank member inclined to its axis, and means for operatively connecting said driving shaft with said crank member, including a power transmitting connection whose axis is inclined to and intersects the axis of said rotary shaft, for transmitting to said driven shaft oscillatory movements.

4. In a mechanical movement, in combination, a rotary driving shaft provided with a shaft crank, a driven shaft arranged substantially at right angles to said driving shaft and provided with a crank member inclined to its axis, and connections between said crank member and said shaft crank for transmitting oscillatory movements to said driven shaft.

5. In a mechanical movement, in combination, a rotary driving shaft provided with a shaft crank, a driven shaft arranged substantially at right angles to said driving shaft and provided with a crank member inclined to its axis and surrounded by a bearing sleeve, and a connection between said shaft crank and bearing sleeve for transmitting oscillatory movements to said driven shaft.

6. In a mechanical movement, in combination, a rotary driving shaft, a driven shaft arranged substantially at right angles to said driving shaft and provided with a crank member inclined to its axis and connections for operatively connecting said driving shaft with said crank member, including a power transmitting connection whose axis is inclined to and intersects the axis of said driving shaft at substantially a given point in the axis of said crank member, for transmitting to said driven shaft oscillatory movements.

7. In a mechanical movement, in combination, a rotary driving shaft provided with a shaft crank, a driven shaft arranged substantially at right angles to said driving shaft and provided with a crank member inclined to its axis, and connections between said crank member and said shaft crank for transmitting oscillatory movements to said driven shaft, and adjusting means for varying the degree of oscillation of the latter.

8. In a mechanical movement, in combination, a rotary driving shaft, a driven shaft arranged substantially at right angles to said driving shaft, said driven shaft being provided with a crank member inclined to its axis, and means including a power transmitting connection having movements about the axis of said driving shaft to transmit from the latter oscillatory movements to said driven shaft.

9. In a mechanical movement, in combination, a rotary driving shaft, a driven shaft arranged substantially at right angles to said driving shaft and provided with a crank member inclined to its axis, means for effecting relative adjustments of said shafts and connections for operatively connecting said driving shaft with said crank member, including a power transmitting connection whose axis is inclined to the axis of said driving shaft, for transmitting to said driven shaft oscillatory movements.

10. In a mechanical movement, in combination, a rotary driving shaft, a driven shaft arranged substantially at right angles to said driving shaft and provided with a crank member inclined to its axis, and connections between said driving shaft and crank member including a power transmitting connection operatively connected with a rocking member carried by said driving shaft to transmit from the latter oscillatory movements to said driven shaft, and adjusting means whereby the angle of inclination of the rocking member is varied with respect to the axis of the driving shaft.

11. In a mechanical movement, in combination, a rotary driving shaft, a driven shaft arranged substantially at right angles to said driving shaft and provided with a crank member inclined to its axis, and connections between said driving shaft and crank member comprising a bearing sleeve mounted on said crank member and provided with a connection inclined to and operatively connected with said driving shaft through a shaft crank carried by the latter, for transmitting to said driven shaft oscillatory movements.

12. In a mechanical movement, in combination, a rotary driving shaft, a driven shaft arranged substantially at right angles to said driving shaft and provided with a crank member inclined to its axis, means for effecting relative adjustments of said shafts and connections between said driving shaft and crank member comprising a bearing sleeve mounted to oscillate on said crank member and provided with a connection inclined to and operatively connected with said driving shaft through a rocking member, for transmitting to said driven shaft oscillatory movements.

In testimony whereof, I have signed my name to this specification.

ALBERT H. DE VOE.

Copies of this patent may be obtained for five cents each, by addressing the "Commissioner of Patents, Washington, D. C."